(12) United States Patent
Rose

(10) Patent No.: US 7,690,563 B2
(45) Date of Patent: Apr. 6, 2010

(54) TRANSACTION SECURITY SYSTEM

(76) Inventor: James M. Rose, 9005 Highway 53, Cotton, MN (US) 55724

( * ) Notice: Subject to any disclaimer, the term of this patent is extended or adjusted under 35 U.S.C. 154(b) by 405 days.

(21) Appl. No.: 11/089,666

(22) Filed: Mar. 25, 2005

(65) Prior Publication Data

US 2006/0054688 A1 Mar. 16, 2006

Related U.S. Application Data

(60) Provisional application No. 60/609,776, filed on Sep. 14, 2004.

(51) Int. Cl.
*G06K 5/00* (2006.01)
(52) U.S. Cl. ........................ 235/380; 235/382
(58) Field of Classification Search ................ 235/380, 235/379, 381, 382; 705/50
See application file for complete search history.

(56) References Cited

U.S. PATENT DOCUMENTS

| | | | |
|---|---|---|---|
| 5,679,940 A * | 10/1997 | Templeton et al. | ........... 235/380 |
| 6,332,134 B1 | 12/2001 | Foster | |
| 6,473,500 B1 * | 10/2002 | Risafi et al. | ............ 379/144.01 |
| 6,529,885 B1 | 3/2003 | Johnson | |
| 6,820,803 B1 | 11/2004 | Browning et al. | |
| 7,225,156 B2 * | 5/2007 | Fisher et al. | ................... 705/50 |
| 2003/0195842 A1 | 10/2003 | Reece | |
| 2003/0226041 A1 | 12/2003 | Palmer et al. | |
| 2004/0078340 A1 | 4/2004 | Evans | |
| 2004/0151353 A1 | 8/2004 | Topping | |
| 2004/0193882 A1 | 9/2004 | Singerle, Jr. | |
| 2004/0230538 A1 | 11/2004 | Clifton et al. | |
| 2004/0236688 A1 | 11/2004 | Bozeman | |
| 2004/0243518 A1 | 12/2004 | Clifton et al. | |
| 2004/0254890 A1 | 12/2004 | Sancho et al. | |
| 2004/0255081 A1 | 12/2004 | Arnouse | |
| 2004/0255127 A1 | 12/2004 | Arnouse | |
| 2005/0005113 A1 | 1/2005 | Dillon et al. | |
| 2005/0005168 A1 | 1/2005 | Dick | |
| 2006/0016877 A1 * | 1/2006 | Bonalle et al. | .............. 235/380 |

* cited by examiner

*Primary Examiner*—Kumiko C Koyama
(74) *Attorney, Agent, or Firm*—Kinny & Lange, P.A.

(57) ABSTRACT

The present invention is a method and system for protecting an identity of a user. The method includes conducting a transaction with a transaction medium issued from of an institution, which provides transaction information to the institution. A government-issued identification number (GIN) of the user and a personal identification number (PIN) of the user are provided to a database. The database returns verification information based on whether the GIN and the PIN provided to the database correspond to a recorded GIN of the user stored in the database and a recorded PIN of the user stored in the database. The institution is allowed to authorize the transaction based on the returned verification information.

21 Claims, 3 Drawing Sheets

TRANSACTION SECURITY SYSTEM

CROSS-REFERENCE TO RELATED APPLICATION(S)

Priority is claimed under U.S. Provisional Patent Application No. 60/609,776, entitled "Financial Transaction Security System", and filed on Sep. 14, 2004, and which is incorporated herein by reference in its entirety.

BACKGROUND OF THE INVENTION

The present invention relates to transactional security systems. More particularly, the present invention relates to security systems used to protect users against identity theft when conducting transactions.

Identity theft in financial transactions is a common concern in today's economy. Stolen checks, credit cards and debit cards provide relatively easy avenues for criminals to illegally purchase goods and services, and drain monetary accounts. Currently, many consumer locations do not provide adequate means for verifying the identity of the purchaser. Generally, credit cards and checks only require a signature comparison or a photograph identification for verification, both of which are made by a cashier. Such verification techniques are easily bypassed by experienced criminals, especially through purchases via the internet.

In addition to identity theft, many institutions that issue credit cards and checks also retain user records, such as photographs, contact information, email addresses, purchase histories, and credit reports. While this may help reduce identity theft, many such institutions are also known to sell the user records to mass-marketers, especially with the advent of mass emailing. This raises many issues with privacy advocates who are wary of providing too much personal information to such institutions. As such, there is a need for a system that provides both identity protection and privacy protection to consumers.

BRIEF SUMMARY OF THE INVENTION

The present invention relates to a method for protecting an identity of a user. The method includes conducting a transaction with a transaction medium issued from an institution. This provides information of the transaction to the institution. The method also includes providing a government-issued identification number (GIN) of the user and a personal identification number (PIN) of the user to a database. The database then returns verification information based on whether the GIN and the PIN provided to the database correspond to a recorded GIN of the user and a recorded PIN of the user, which are stored in the database. The institution is then allowed to authorize the transaction based on the returned verification information.

The present invention further relates to a system for protecting an identity of a user. The system includes a database that has a recorded GIN of the user and a recorded PIN of the user. The database sends verification information based on whether a GIN and a PIN sent to the database correspond to the recorded GIN and the recorded PIN. The system also includes a terminal for conducting a transaction with a transaction medium issued from an institution. The terminal includes an input component for receiving the transaction medium, an entered GIN from the user, and an entered PIN from the user. The terminal also includes a communicator in signal communication with the database and with the institution. The communicator sends the entered GIN and the entered PIN to the database and receives the verification information from the database. The communicator also sends transaction information to the institution and receives transaction authorization information from the institution.

Unless otherwise explicitly stated, the following definitions apply herein:

"Transaction medium" is defined as any media or data that is issued from an institution, and that identifies a transaction to the institution when used (e.g., when read, scanned, or entered). Examples of transaction medium include checks, credit cards, debit cards, other currency substitutes, scannable airline and vehicle boarding passes, hospital identification cards, school identification cards, transactional codes, and combinations thereof. For example, a credit card (i.e., transaction medium) is issued from a credit card company (i.e., institution), and identifies a purchase (i.e., transaction) to the credit card company when scanned.

"Institution" is defined as any entity that issues transaction medium to users and monitors the use of the transaction medium, and any secondary party that is in privity with the entity. Examples of institutions include banks, credit card companies, transportation companies, health care providers, and schools.

"User" is defined as any entity that may be issued a transaction medium. Examples of users include individuals, businesses, corporations, partnerships, governments, and profit and non-profit organizations.

DETAILED DESCRIPTION

Figures 1A, 1B:
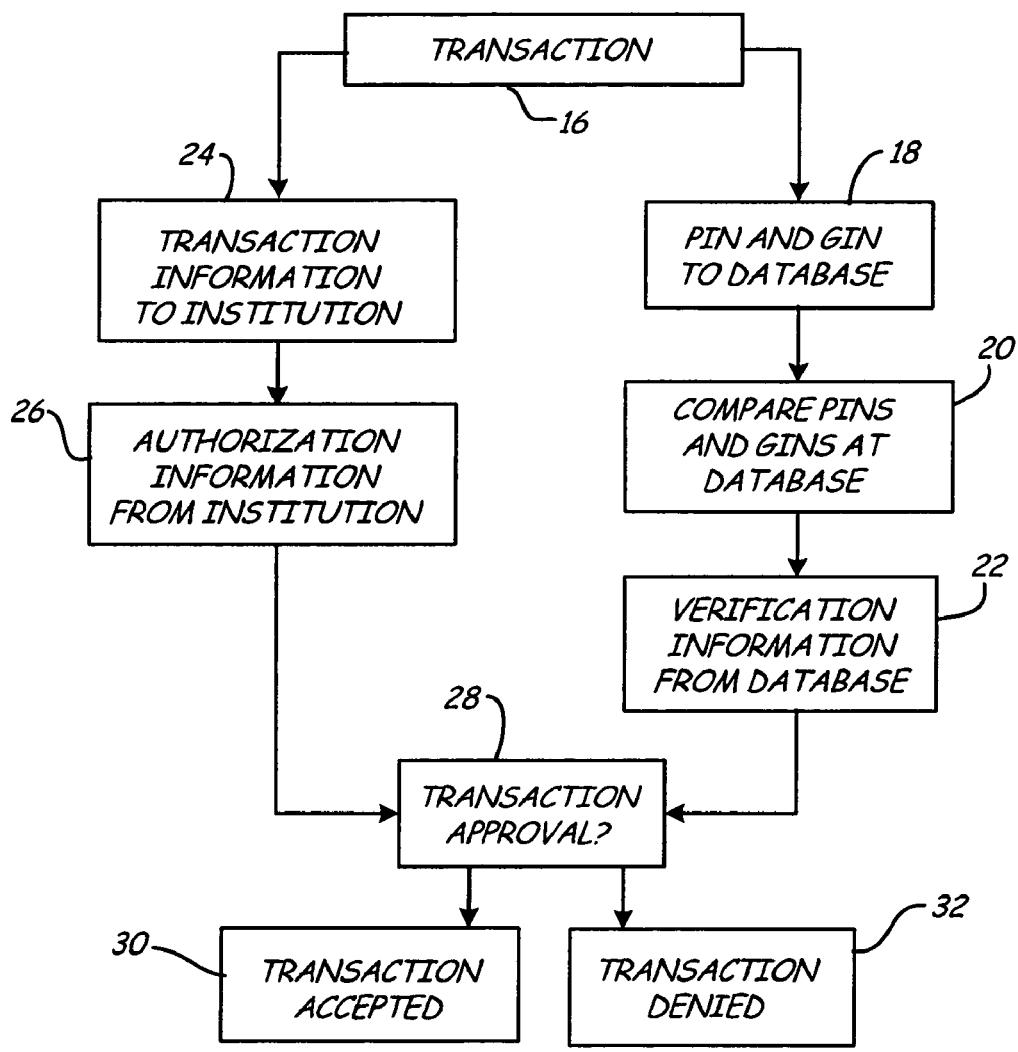
FIG. 1A is a block diagram of a method of creating an identity account pursuant to the present invention.
FIG. 1B is a block diagram of a method of protecting an identity of a user during a transaction pursuant to the present invention.

FIGS. 1A and 1B are block diagrams of a method of the present invention for protecting a user's identity when the user conducts a transaction with a transaction medium that is issued from an institution. The method of the present invention includes creating a user identity account (FIG. 1A), and protecting the user's identity during a transaction (FIG. 1B).

FIG. 1A includes steps 10-14, which depict a preferred embodiment for creating a user identity account. As shown in step 10, the user identity account is set up by first establishing the user's identity. The user's identity may be established by obtaining a full legal name, a date of birth, and a photograph of the user, and by performing a biometric scan on the user. Examples of suitable biometric scans include fingerprint identification, retinal scans, and combinations thereof. The use of biometric scanning provides accurate identification means to reduce the risk of falsely identifying a user.

In step 12, once the user's identity is established, the user may then choose a combination of indicia (e.g., letters and numbers) to form a personal identification number (PIN). The PIN is a confidential combination that is intended to be known only by the user, and is desirably used during all transactions with a transaction medium.

In step 14, the user identity account is completed when the established user identity information (including biometric results) and the user's PIN are provided to a secure database. In addition, the present invention also utilizes a government-issued identification number (GIN) of the user, which is also provided to the secure database. Examples of suitable GINs include numbers assigned by individual states or national agencies, such as state driver's license numbers, social security numbers, passport numbers, corporation registration numbers, and other government-issued numbers (e.g., for non-United States citizens). The database then stores the user's identity account (e.g., the established identity information, the PIN, and the GIN) to provide identity protection during subsequent transactions. The PIN of the user and the GIN of the user that are stored in the database are herein referred to as a "recorded PIN" and a "recorded GIN".

FIG. 1B includes steps 16-32, which depict a preferred embodiment for protecting the user's identity during a transaction with a transaction medium. In step 16, the user conducts a transaction with the transaction medium at a consumer location. For example, the user may conduct a purchase with a credit card at a retail store. While the user conducts the transaction in step 16, the user also enters the PIN and the GIN into an input component, such as a keypad or a scanning device. In step 18, the entered PIN and the entered GIN are sent to the database that stores the user's identity account.

In step 20, the database compares the PIN sent to the database to the recorded PIN of the user, and compares the GIN sent to the database to the recorded GIN of the user. In step 22, the database then sends verification information back to the consumer location. The content of the verification information is based on whether the PIN and the GIN sent to the database correspond to the recorded PIN and the recorded GIN. If the PINs and the GINs correspond to each other (i.e., the sent PIN matches the recorded PIN, and the sent GIN matches the recorded GIN), then the verification information signifies a "positive" identification. If the PINs and the GINs do not correspond to each other, then the verification information signifies a "negative" identification.

As shown in step 24, information regarding the transaction is also sent to the institution that issued the transaction medium. Continuing with the above-example, the credit card may be swiped in a credit card scanner, and the information regarding the credit card purchase is then sent to the credit card company. The entered PIN and the entered GIN, however, are not sent to the institution. This prevents the institution from obtaining private information of the user. In step 26, the institution then sends authorization information for the transaction back to the consumer location. The authorization information dictates whether or not the institution will allow the transaction to be completed, and is dependent on the verification information sent from the database.

In step 28, a determination of whether the transaction is approved is made based on the verification information sent from the database and the authorization information sent from the institution. If the authorization information requires that the identification is accepted, and the verification information sent from the database signifies a positive identification, then the transaction will be allowed to be completed, as shown in step 30. However, if the verification information sent from the database signifies a negative identification, then the transaction will not be allowed to be completed, as shown in step 32.

In an alternative embodiment, the institution may send authorization information in step 26 that allows the transaction to be completed, as shown in step 30, even if the verification information sent from the database signifies a negative identification. In this alternative, the institution may accept the risk of continuing without the identity verification. However, in the preferred embodiment of the present invention, the transaction approval is dependent on the verification information. This protects the user and the institution from accepting a transaction subject to identity theft.

From the viewpoint of the consumer location, the transactions will either be accepted (step 30) or denied (step 32). Preferably, no further information is provided by the database or the institution. This further protects the user's privacy and identity, and allows the transaction to proceed without undue delays. The resulting effect of the present invention is that stolen transaction medium (e.g., stolen checks, credit cards, debit cards, and passwords) no longer have value to criminals. Correspondingly, the use of a PIN and a GIN with the identity account reduces the chances of a user having an identity stolen.

If the user's PIN is compromised, the user may update the identity account by merely reestablishing his or her identity and creating a new PIN. Identity reestablishment may be accomplished by performing another biometric scan of the user. The results of this subsequent biometric scan are compared to the initial biometric scan results performed for the initial identity account. If the subsequent biometric scan results correspond to the initial biometric scan results, the user's identity is reestablished. The database may retain a track record of the established identity information and the PINs of the user. This allows users to have direct control of over their identity security.

The present invention allows national and international use of identity accounts, and greatly reduces the ability to create false identities and accounts for the purposes of fraudulent transactions. For example, the present invention may be used to assist in identifying individuals in a number of activities, and may be used to decrease identity theft, terrorism through financial activity, and multiple identities used by one user.

In addition to financial transactions as generally discussed above, the present invention may also be used with a variety of additional applications. For example, the present invention may be used to end fraudulent telephone communications and internet soliciting. In particular, the present invention may be used by telecommunication and internet companies to establish a positive identity of a user relying on their services. This makes it easier for the telecommunication and internet companies to determine who is performing the illegal acts, which provides a deterrent to such activities.

The present invention also allows users purchasing items by telephone or the internet to be secure with their identity and less vulnerable to financial scams. Individuals will be able to provide financial information (e.g., credit card numbers) without fear of the financial information being used by criminals. This is because the financial information is not useful without the user's PIN. For example, during a purchase over the internet, the user generally provides all the required information, including a credit card number. The transaction information is then sent to the credit card company from the seller's location. The credit card company then returns authorization information, as discussed above. The user may enter the PIN and GIN at a secure web site or by telephone, which is then directed to the database for comparison to the recorded PIN and the recorded GIN. The database then directs verification information to the seller's location, and the transaction is either accepted or denied, as discussed above.

In one embodiment, due to the potential delay in telephone and internet transactions, the user may have a set amount of time (e.g., 72 hours) to provide the PIN and the GIN to the database. If the user conducting the transaction does not provide the PIN and the GIN within the set amount of time, the transaction is denied. As such, the seller has no control over the verification process.

Another application of the present invention includes public and private security monitoring. The present invention may increase security and reduce time for security checks in public and private areas. For example, a user entering a secure area may present a state-issued identification, which is passed through a scanner to read the user's GIN. The user may then enter the PIN into an input component (e.g., keypad). The PIN and the GIN are then sent to the database for comparison to the record PIN and the recorded GIN, as discussed above. The database will return the verification information, which the institution controlling the secure area may use to determine whether or not to allow the user to enter the given area.

In another embodiment of the present invention, the database may also maintain a record of all persons convicted of a financial transaction crime. If such a person conducts a financial transaction while using the present invention, the database may deny the action. Additionally, if such a person is attempting to use a transaction medium and the entered PIN and GIN do not correspond to the record PIN and the recorded GIN, the database may notify local authorities of the person's actions and location. This assists law enforcement personnel with tracking potential perpetrators of identity theft.

While the above-discussion is focused on a single user, the present invention is intended for use with multiple users, where the database stores the identity accounts of each of the users. Preferably, the present invention is used by every user that conducts transactions with a transaction medium. This increases the identity protection capability of the present invention, and further reduces the risk of identity theft.

Figure 2A:
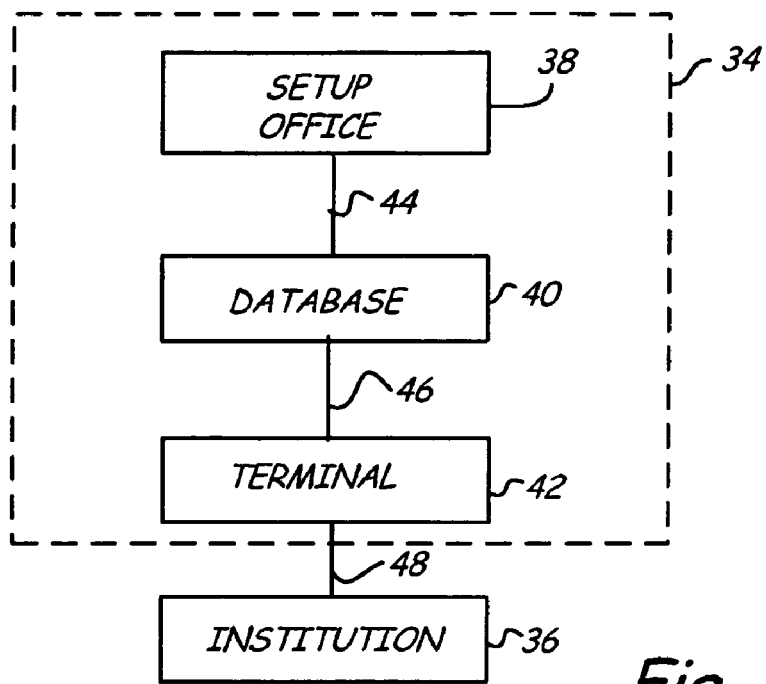
FIG. 2A is a block diagram of a system of the present invention.

FIG. 2A is a block diagram of a system 34 of the present invention in use with an institution 36, where the system 34 is an example of a suitable system for performing the method of the present invention. As shown, the system 34 includes a setup office 38, a database 40, and a terminal 42, all of which are remotely located from each other, and from the institution 36. The database 40 is connected to the setup office 38 and the terminal 42 by communication lines 44 and 46, respectively. The terminal 42 is also connected to the institution 36 by a communication line 48. The system 34 of the present invention protects an identity of a user when the user conducts a transaction at the terminal 42 with a transaction medium that is issued from the institution 36. The institution 36 is a standard institution, as previously defined.

The communication lines 44, 46, and 48 allow the institution 36, the setup office 38, the database 40, and the terminal 42 to communicate with each other via digital or analog signals. Examples of suitable connections for the communication lines 44, 46, and 48 include long-distance electrical, fiber optic, satellite connections, and other conventional telecommunication networks. In one embodiment, the communication lines 44 and 46 are each secure, dedicated lines or networks. As such, the communication line 44 is only accessible from the setup office 38 or the database 40, and the communication line 46 is only accessible from the database 40 or the terminal 42. This prevents external tampering with communications between the respective components of the system 34. The communication line 48 may be any conventional, non-dedicated telecommunication network that allows communication between the institution 36 and the terminal 42.

The setup office 38 is the location where the user may set up an identity account with the system 34 to provide subsequent identity protection during transactions. The setup office 38 may include a variety of identification mechanisms for establishing the identity of the user (e.g., biometric scanners). User identity accounts (i.e., established identity information, the record PIN, and the recorded GIN) are sent from the setup office 38 to the database 40 via the communication line 44. In a preferred embodiment of the present invention, the system 34 includes multiple setup offices connected to the database 40 with multiple communication lines 44. For example, setup offices may be located in various Department of Motor Vehicle offices of each state. This allows the system 34 to have a national identity account registry. Additionally, setup offices may also be located globally, such as in United States embassies and foreign governmental departments located throughout the world.

The database 40 may be any suitable storage arrangement that provides a secure and reliable storage for user identity accounts. In one embodiment, the database 40 is one or more computer servers located at a secure site. Alternatively, the database 40 may also be divided into multiple sub-database sites located in different regions that communicate with each other while operating. The database 40 receives and stores user identity accounts from the setup office 38 via the communication line 44. The database 40 also receives PINs and GINs from the terminal 42 via the communication line 46, and compares the received PINs and GINs to the recorded PINs and the recorded GINs. The database 40 also sends verification information to the terminal 42 via the communication line 46.

The database 40 is desirably not accessible by third parties, such as the institution 36. This prevents the third parties from obtaining the established identity information and the PIN of the user, which protects the privacy of the user from unwanted dissemination of personal information. The database may be operated by an accountable governmental agency or by a non-governmental agency that is accountable to the government and the public.

The terminal 42 is a transactional terminal at a consumer location where a user conducts a transaction. In a preferred embodiment, the system 34 includes multiple terminals, such that any transaction conducted by the user with a transaction medium may be performed at a terminal of the system 34. This allows the system 34 to continuously protect the user's identity. In this preferred embodiment, the multiple terminals are connected to the database 40 via multiple communication lines 46.

Pursuant to the method of the present invention, a user creates an identity account at the setup office 38, which sends the user's established identity information, the user's PIN, and the user's GIN to the database 40 for secure storage. During a subsequent transaction at the terminal 42, the user scans transaction medium, and enters the PIN and GIN into the terminal 42. The terminal 42 then sends the entered PIN and GIN to the database 40, where they are compared to the recorded PIN and the recorded GIN. The database 40 then sends verification information back to the terminal 42. Concurrently with the database communication, the terminal 42 also sends transaction information to the institution 36, which then sends back authorization information to the terminal 42. The transaction is then allowed to proceed based on the verification information and the authorization information, as discussed above.

The embodiment shown in FIG. 2A is a simplified example of the system 34 of the present invention. In a preferred embodiment, the system 34 is interconnected with multiple terminals (e.g., the terminal 42) and multiple institutions (e.g., the terminal 36), such that multiple users may conduct transactions at terminals located in a variety of locations (e.g., retail stores, restaurants, and transportation hubs).

Figure 2B:
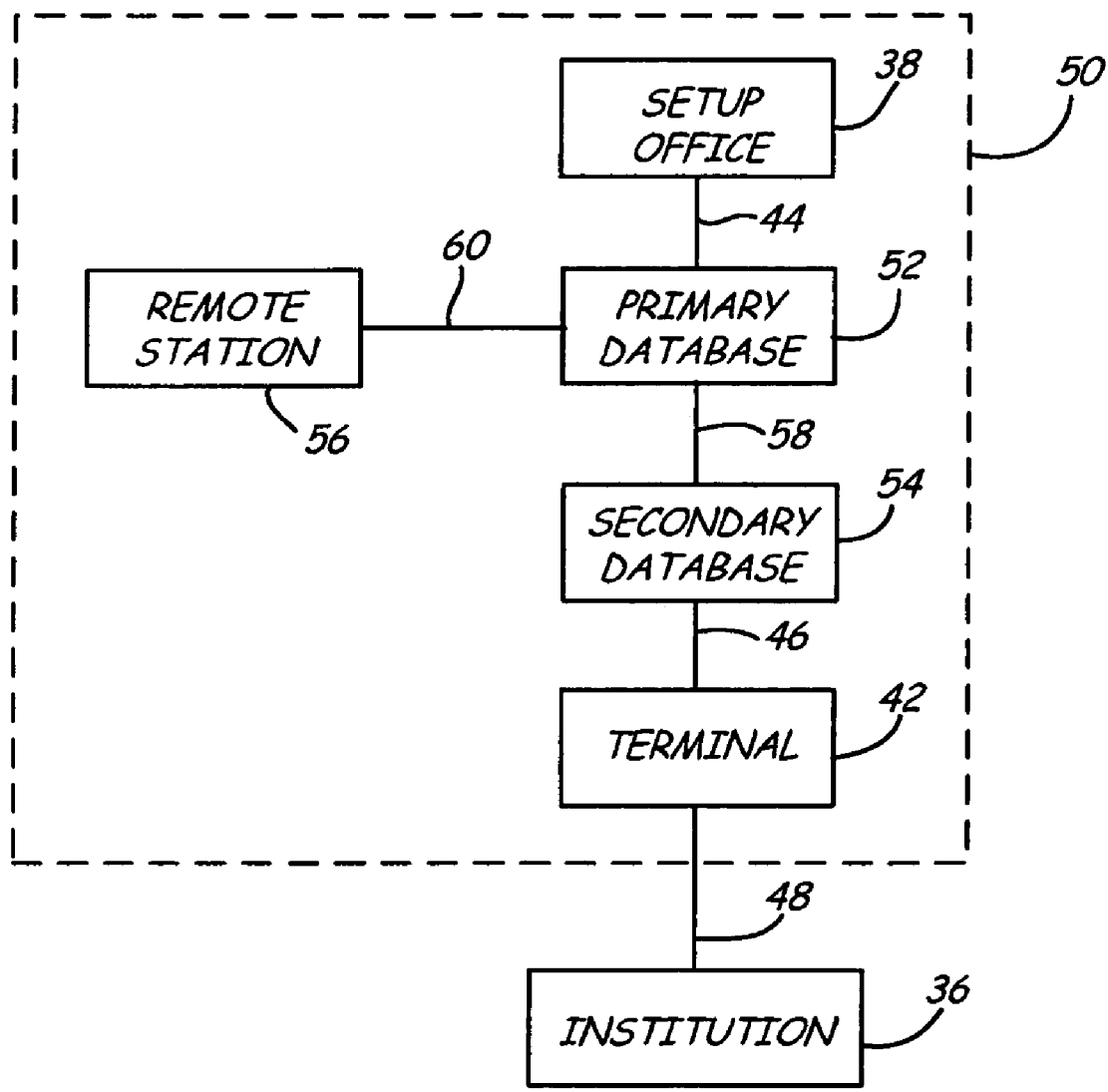
FIG. 2B is a block diagram of an alternative system of the present invention.

FIG. 2B is a block diagram of a system 50 of the present invention in use with the institution 36, where the system 50 is an example of an alternative system for performing the method of the present invention. As shown, the system 50 includes the setup office 38, the terminal 42, the communication lines 44, 46, and 48, a primary database 52, a secondary database 54, a remote station 56, and communication lines 58 and 60. The setup office 38, the terminal 42, and the communication lines 44, 46, and 48 function in the same manner as discussed above in FIG. 2A, with the exception that the database 40 is replaced with the primary database 52 and the secondary database 54. The primary database 52 is connected to the setup office 38, the secondary database 54, and the remote station 56 by the communication lines 44, 58, and 60, respectively.

The communication lines 58 and 60 allow the primary database 52, the secondary database 54, and the remote station 56 to communicate with each other via digital or analog signals. Examples of suitable connections for the communication lines 58 and 60 include long-distance electrical, fiber optic, satellite connections, and other conventional telecommunication networks. In one embodiment, the communication lines 58 and 60 are each secure, dedicated lines or networks. As such, the communication line 58 is only accessible from the primary database 52 or the secondary database 54, and the communication line 60 is only accessible from the primary database 52 or the remote station 56. This prevents external tampering with communications between the respective components of the system 50.

The primary database 52 and the secondary database 54 are each similar to the database 40, and each may be any suitable storage arrangement that provides a secure and reliable storage for user identity accounts or recorded PINs and recorded GINs. The primary database 52 receives and stores user identity accounts from the setup office 38 via the communication line 44 and from the remote terminal 56 via the communication line 60. However, in contrast to the database 40, the database 52 does not directly interact with the terminal 42. Instead, the database 52 relays the recorded PINs and the recorded GINs to the secondary database 54.

The secondary database 54 only stores the recorded PINs and the recorded GINs, and contains no additional user information. The secondary database 54 receives PINs and GINs from the terminal 42 via the communication line 46, and compares the received PINs and GINs to the recorded PINs and the recorded GINs. The secondary database 54 also sends verification information to the terminal 42 via the communication line 46. Because the secondary database 54 only stores the recorded PINs and the recorded GINs, the terminal 42 does not directly interact with a database that contains user information. This further reduces the risk of private user information from being stolen, and simplifies the comparison process (i.e., step 20 in FIG. 1B) during a transaction with the present invention.

The remote station 56 may be any suitable station for updating the identity account of a user, as discussed above. In one embodiment, the remote station 56 is a biometric scan station that allows a user to enter a GIN, or alternatively, the user's name and date of birth. The user may then perform a subsequent biometric scan. The entered information and the subsequent biometric scan results are relayed to the primary database 52, where the subsequent biometric scan results are compared to the initial biometric scan results previously obtained at the setup office 38. If the subsequent biometric scan results correspond to the initial biometric scan results, the user's identity is reestablished. The user may then create a replacement PIN at the remote station 56. The primary database 52 then updates the secondary database 54 with the replacement PIN.

While shown as a single station, a preferred embodiment of the present invention includes multiple remote stations 56. Additionally, each remote station 56 is desirably a small station, similar in size to an automated teller machine (ATM), which allows the remote stations 56 to be placed in a variety of convenient locations. For example, the remote stations 56 may be placed in shopping centers, banks, and government offices. Moreover, the remote stations 56 may be fully automated in the same manner as ATMs. This allows users to update their identity accounts and obtain replacement PINs twenty-four hours a day, and on any day of the year. This increases the convenience and versatility of the present invention. While shown in use with the primary database 52, the remote station 56 may be used with the database 40, discussed above in FIG. 2B, in the same manner.

Figure 3:
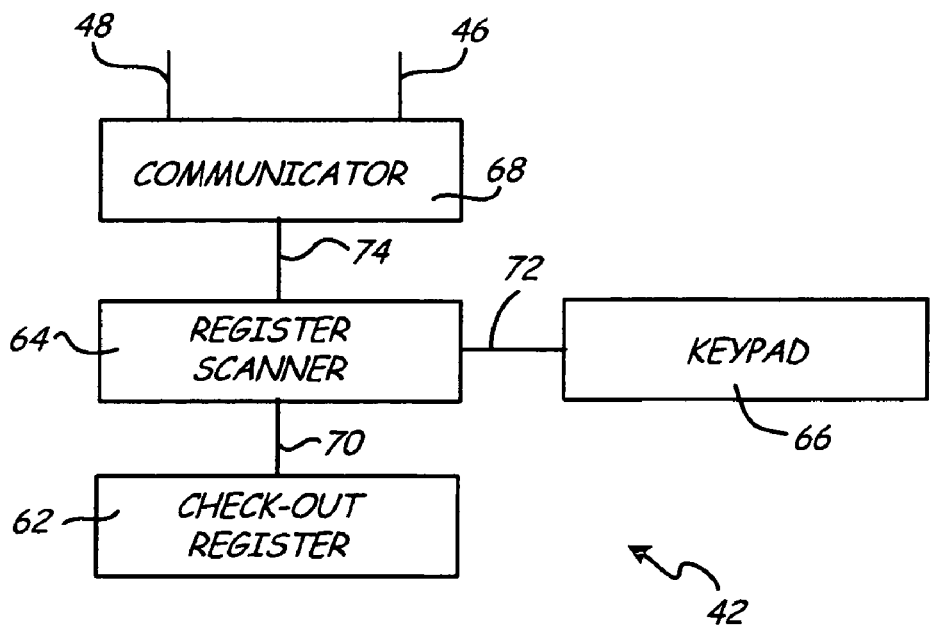
FIG. 3 is a block diagram of a transaction terminal of the system of the present invention.

FIG. 3 is a block diagram of the terminal 42, which is an example of a suitable terminal for use with the present invention. As shown, the terminal 42 includes a check-out register 62, a register scanner 64, a keypad 66, and a communicator 68. The check-out register 62 and the keypad 66 are connected to the register scanner 64 by signal connections 70 and 72, respectively. The register scanner 64 is also connected to the communicator 68 by a signal connection 74. The signal connections 70, 72, and 74 allow the respective connected components to communicate with each other via digital or analog signals. Typically, check-out register 62, the register scanner 64, the keypad 66, and the communicator 68 are located in the same general vicinity. As such, the signal connections 70, 72, and 74 are preferably electrical cables.

The check-out register 62 is a conventional register for purchasing goods and services, such as a cash register or a computer in a department store. The register scanner 64 is a scanning device similar to a conventional check reader or credit card scanner. Examples of suitable devices for the register scanner 64 include a credit card reader, a check reader, a driver's license reader, an image reader, a camera, and combinations thereof. The keypad 66 is a keypad for entering a PIN and/or a GIN, but may alternatively be other input systems (e.g., a keyboard or a touch-screen display). The register scanner 64 and the keypad 66 are examples of a suitable input components of the terminal 42. The communicator 68 is a communication system, such as a modem, for communicating with the institution 36 (not shown) via the communication line 48 and with the database 40 (not shown) or the secondary database 54 (not shown) via the communication line 46.

During a transaction with a credit card, a user scans the credit card in the register scanner 64 and enters the PIN and GIN in the keypad 66. Alternatively, the user may scan a government-issued card (e.g., a state-issued driver's license) in the register scanner to obtain the user's GIN. In another alternative, the transaction medium may contain the user's GIN. The transaction information, the PIN, and the GIN are then transferred to the communicator 68. The communicator 68 then sends the transaction information to the institute 36 and the PIN and GIN to the database.

In an alternative embodiment of the present invention, the register scanner 64, the keypad 66, and the communicator 68 may be a single unit that connects to the check-out register 62. This allows the system 34 of the present invention to be integrated with existing retail equipment with minimal additional labor. The system 34 of the present invention provides a means for checking the identity of a user during a transaction with a transaction medium. This protects the user's identity and privacy, and reduces the effectiveness of identity theft in the commercial industry.

Although the present invention has been described with reference to preferred embodiments, workers skilled in the art will recognize that changes may be made in form and detail without departing from the spirit and scope of the invention.

The invention claimed is:

1. A method for protecting an identity of a user having a transaction medium issued from an institution, the method comprising:

establishing the identity of the user, thereby obtaining identity information of the user;

providing the identity information of the user to a database that is remotely located from the institution and that is not accessible by the institution;

providing a recorded government-issued identification number (GIN) of the user to the database;

providing a recorded personal identification number (PIN) of the user to the database;

conducting a transaction with the transaction medium at a transaction location that is remote from the database, wherein the transaction is conducted after the identity information of the user, the recorded GIN of the user, and the recorded PIN of the user are provided to the database;

entering a GIN of the user and a PIN of the user into an input component at the transaction location;

providing the entered GIN of the user and the entered PIN of the user to the database, wherein the database returns verification information based on whether the entered GIN and the entered PIN provided to the database correspond to the recorded GIN of the user stored in the database and the recorded PIN of the user stored in the database;

providing transaction information to the institution while conducting the transaction, wherein the entered PIN of the user that is provided to the database is not provided to the institution, and wherein transaction information that is provided to the institution is not provided to the database so that neither the database nor the institution contain both (a) the GIN and PIN of the user and (b) the transaction information; and allowing the institution to authorize the transaction based on the returned verification information.

2. The method of claim 1, wherein the establishing the identity of the user comprises biometric scanning.

3. The method of claim 1, wherein the entered GIN that is provided to the database is not provided to the institution.

4. The method of claim 1, wherein the input component is selected from a group consisting of a credit card reader, a check reader, a driver's license reader, an image reader, a camera, and combinations thereof.

5. The method of claim 1, wherein the institution authorizes the transaction when the verification information signifies that the GIN provided to the database matches the recorded GIN and that the PIN provided to the database matches the recorded PIN.

6. The method of claim 1, wherein the user updates the recorded PIN to the database by rechecking the identity of the user at an automated remote station, wherein the automated remote station is in signal communication with the database for sending rechecked identity information of the user and the updated recorded PIN to the database.

7. The method of claim 6, wherein rechecking the identity of the user comprises biometric scanning.

8. A system for protecting an identity of a user having a transaction medium issued from an institution, the system comprising:

a database comprising a recorded government issued identification number (GIN) of the user and a recorded personal identification number (PIN) of the user, wherein the database sends verification information based on whether a GIN and a PIN sent to the database correspond to the recorded GIN and the recorded PIN, and wherein the database is remotely located from the institution and is not accessible by the institution;

an identification mechanism for establishing the identity of the user, wherein the mechanism is in signal communication with the database for sending established identity information of the user, the recorded GIN, and the recorded PIN to the database; and a terminal for conducting a transaction with the transaction medium after the established identity information, the recorded GIN and the recorded PIN are sent to the database, the terminal being remotely located from the database, and comprising:

an input component for receiving the transaction medium, an entered GIN from the user, and an entered PIN from the user; and a communicator in signal communication with the database and with the institution, wherein the communicator sends the entered GIN and the entered PIN to the database and receives the verification information from the database, wherein the communicator sends transaction information to the institution and receives transaction authorization information from the institution, wherein the communicator does not send the entered PIN to the institution, and wherein the communicator does not send the transaction information to the database so that neither the database nor the institution contain both (a) the GIN and PIN of the user and (b) the transaction information.

9. The system of claim 8, wherein the identification mechanism comprises a biometric scanner.

10. The system of claim 8, and further comprising a remote station for rechecking the identity of the user, wherein the remote station is in signal communication with the database for sending rechecked identity information of the user and an updated recorded PIN to the database, wherein the remote station is fully automated, and wherein the remote station comprises a biometric scanner.

11. The system of claim 8, wherein the input component is selected from a group consisting of a credit card reader, a check reader, a driver's license reader, an image reader, a camera, and combinations thereof.

12. The system of claim 8, wherein the communicator comprises a first connection to the database and a second connection to the institution, wherein the first connection and the second connection are separate.

13. The system of claim 12, wherein the first connection comprises a dedicated communication line for signal communication between the terminal and the database.

14. The system of claim 12, wherein the second connection comprises a non dedicated communication line for signal communication between the terminal and the institution.

15. A system for protecting an identity of a user during a transaction with a transaction medium issued from an institution, the system comprising:

an identification mechanism for establishing the identity of the user, and for receiving a recorded government issued identification number (GIN) of the user and a recorded personal identification number (PIN) of the user;

a primary database in signal communication with the identification mechanism for storing identity information of the user, the recorded GIN, and the recorded PIN, wherein the primary database is remotely located from the institution and is not accessible by the institution;

a secondary database in signal communication with the primary database for storing the recorded GIN and the recorded PIN, wherein the secondary database is remotely located from the institution and is not accessible by the institution;

a terminal for conducting the transaction after the recorded GIN and the recorded PIN are stored in the secondary database, the terminal being remotely located from the secondary database, and comprising:

an input component for receiving the transaction medium, an entered GIN from the user, and an entered PIN from the user; and a communicator in signal communication with the secondary database for sending the entered GIN and the entered PIN to the secondary database and for receiving verification information from the secondary database, wherein the verification information is based on whether the entered GIN and the entered PIN sent to the secondary database correspond to the recorded GIN and the recorded PIN, and wherein the communicator does not send the entered PIN to the institution, so that neither the database nor the institution contain both (a) the GIN and PIN of the user and (b) the transaction information.

16. The system of claim 15, wherein the communicator is in signal communication with the institution for sending transaction information to the institution and for receiving transaction authorization information from the institution, and wherein the communicator does not send the transaction information to the secondary database.

17. The system of claim 15, wherein the identification mechanism comprises a biometric scanner.

18. The system of claim 15, wherein the input component is selected from a group consisting of a credit card reader, a check reader, a driver's license reader, an image reader, a camera, and combinations thereof.

19. The system of claim 15, wherein the entered GIN is not provided to the institution.

20. The system of claim 15, and further comprising a remote station for rechecking the identity of the user, wherein the remote station is in signal communication with the primary database for sending rechecked identity information of the user and an updated recorded PIN to the primary database, wherein the remote station is fully automated, and wherein the remote station comprises a biometric scanner.

21. A system for protecting an identity of a user in a transaction with an institution, the system comprising:

a database comprising a recorded government issued identification number (GIN) of the user and a recorded personal identification number (PIN) of the user, wherein the database sends verification information based on whether a GIN and a PIN sent to the database correspond to the recorded GIN and the recorded PIN, and wherein the database is remotely located from the institution and is not accessible by the institution;

an identification mechanism for establishing the identity of the user, wherein the mechanism is in signal communication with the database for sending established identity information of the user, the recorded GIN, and the recorded PIN to the database; and a terminal for authorizing a transaction with the institution after the established identity information, the recorded GIN, and the recorded PIN are sent to the database, the terminal being remotely located from the database, and comprising:

an input component for receiving an entered GIN from the user, and an entered PIN from the user; and a communicator in signal communication with the database, wherein the communicator sends only the entered GIN and the entered PIN to the database and receives the verification information from the database, wherein the verification information signifies that the GIN provided to the database matches the recorded GIN and that the PIN provided to the database matches the recorded PIN, wherein the entered PIN of the user that is provided to the database is not provided to the institution, and wherein transaction information that is provided to the institution is not provided to the database so that neither the database nor the institution contain both (a) the GIN and PIN of the user and (b) the transaction information.

* * * * *